(12) United States Patent
Deng et al.

(10) Patent No.: US 12,349,066 B2
(45) Date of Patent: Jul. 1, 2025

(54) MULTIMEDIA DATA PROCESSING METHOD AND APPARATUS, ELECTRONIC DEVICE, AND STORAGE MEDIUM

(71) Applicant: Tencent Technology (Shenzhen) Company Limited, Shenzhen (CN)

(72) Inventors: Yuping Deng, Shenzhen (CN); Wenping Shi, Shenzhen (CN); Shifei Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 427 days.

(21) Appl. No.: 17/881,492

(22) Filed: Aug. 4, 2022

(65) Prior Publication Data

US 2022/0377667 A1 Nov. 24, 2022

Related U.S. Application Data

(63) Continuation of application No. PCT/CN2021/101786, filed on Jun. 23, 2021.

(30) Foreign Application Priority Data

Jul. 30, 2020 (CN) .......................... 202010750579.9

(51) Int. Cl.
*H04W 52/02* (2009.01)
*H04W 12/04* (2021.01)
*H04W 12/06* (2021.01)

(52) U.S. Cl.
CPC ....... *H04W 52/0225* (2013.01); *H04W 12/04* (2013.01); *H04W 12/06* (2013.01)

(58) Field of Classification Search
CPC ...... H04L 65/75; H04N 7/186; H04N 23/651; H04W 12/033; H04W 12/04;
(Continued)

(56) References Cited

U.S. PATENT DOCUMENTS 8,909,211 B2 12/2014 Huq et al.
10,083,390 B2 * 9/2018 Kim ................. G09F 3/208
(Continued)

FOREIGN PATENT DOCUMENTS

CN 103886347 A 6/2014
CN 205304975 U 6/2016
(Continued)

OTHER PUBLICATIONS

Tencent Technology, ISR, PCT/CN2021/101786, Sep. 27, 2021, 2 pgs.
(Continued)

*Primary Examiner* — Wutchung Chu
(74) *Attorney, Agent, or Firm* — Morgan, Lewis & Bockius LLP

(57) ABSTRACT

This application provides a multimedia data processing method performed by an electronic device, and a non-transitory computer-readable storage medium. The method includes: receiving, by an electronic device in a first wireless communication frequency band, a wakeup instruction transmitted by a server through a wireless network transmission device; performing data acquisition on an environment of the electronic device according to the wakeup instruction, to obtain multimedia data; and transmitting the multimedia data to the wireless network transmission device in a second wireless communication frequency band, and then transmitting the multimedia data to a terminal through the wireless network transmission device, frequencies of the first wireless communication frequency band being less than frequencies of the second wireless communication frequency band.

20 Claims, 7 Drawing Sheets

(58) Field of Classification Search
CPC ............. H04W 12/06; H04W 52/0212; H04W 52/0225; Y02D 30/70
See application file for complete search history.

(56) References Cited

U.S. PATENT DOCUMENTS

| | | | | |
|---|---|---|---|---|
| 2002/0126780 | A1* | 9/2002 | Oshima | H04H 60/91 705/56 |
| 2014/0353368 | A1* | 12/2014 | Connolly | H04W 52/0216 235/375 |
| 2016/0094965 | A1* | 3/2016 | Sennett | H04W 4/90 455/404.1 |
| 2016/0173939 | A1* | 6/2016 | Iwami | H04W 52/0261 725/139 |
| 2018/0317172 | A1* | 11/2018 | Lepp | H04W 52/0212 |
| 2019/0147874 | A1 | 5/2019 | Mai | |
| 2019/0182736 | A1* | 6/2019 | Jung | H04W 84/12 |
| 2019/0246072 | A1* | 8/2019 | Siann | G08B 13/19656 |
| 2019/0364566 | A1* | 11/2019 | Husted | H04W 72/51 |
| 2021/0045055 | A1* | 2/2021 | Winson | H04W 52/0219 |
| 2021/0076435 | A1* | 3/2021 | Cheong | H04W 4/80 |
| 2021/0256833 | A1* | 8/2021 | Daoura | H04W 4/021 |
| 2021/0314940 | A1* | 10/2021 | Sugaya | H04W 72/0453 |
| 2021/0360446 | A1* | 11/2021 | Laurans | H04W 24/04 |
| 2022/0165146 | A1* | 5/2022 | Daoura | H04W 8/005 |
| 2023/0007716 | A1* | 1/2023 | Inohiza | H04W 48/16 |
| 2023/0069398 | A1* | 3/2023 | Yi | H04W 74/0808 |

FOREIGN PATENT DOCUMENTS

| | | | | |
|---|---|---|---|---|
| CN | 103886347 | B | * | 10/2017 |
| CN | 108661462 | A | | 10/2018 |
| CN | 111586814 | A | * | 8/2020 |
| CN | 111629427 | A | | 9/2020 |
| ES | 2670970 | T3 | * | 6/2018 ............. H04B 17/27 |
| JP | 2004168482 | A | | 6/2004 |
| WO | WO-2013019287 | A1 | * | 2/2013 ......... G06F 16/9535 |
| WO | WO 2017113096 | A1 | | 7/2017 |

OTHER PUBLICATIONS

Tencent Technology, WO, PCT/CN2021/101786, Sep. 27, 2021, 5 pgs.
Tencent Technology, IPRP, PCT/CN2021/101786, Jan. 31, 2023, 6 pgs.
Tencent Technology (Shenzhen) Company Limited, EESR, EP 21850501.4, Sep. 18, 2023, 8 pgs.

* cited by examiner

MULTIMEDIA DATA PROCESSING METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2021/101786, entitled "MULTIMEDIA DATA PROCESSING METHOD AND APPARATUS, AND ELECTRONIC DEVICE AND STORAGE MEDIUM" filed on Jun. 23, 2021, which claims priority to Chinese Patent Application No. 202010750579.9, filed with the State Intellectual Property Office of the People's Republic of China on Jul. 30, 2020, and entitled "Multimedia data processing method and device, electronic equipment and storage medium", all of which are incorporated herein by reference in their entirety.

FIELD OF THE TECHNOLOGY

This application relates to the field of cloud technologies and intelligent hardware technologies, and in particular, to a multimedia data processing method and apparatus, an electronic device, and a computer-readable storage medium.

BACKGROUND OF THE DISCLOSURE

With the development of cloud computing and popularization of intelligent hardware, because of advantages such as convenient installation, wiring-free, capability to remotely view through a mobile terminal, and timely alarming, low-power video monitoring devices are widely applied to the field of security and protection, and are mainly in such forms as a wiring-free network camera, a visual intercom doorbell, and an intelligent doorbell with a camera. The advantage of wiring-free (for example, a power cable and a network cable) correspondingly has a quite high requirement for power consumption of the video monitoring device.

Currently, although some similar wiring-free video monitoring products such as a Wireless Fidelity (Wi-Fi) intelligent electronic doorbell have appeared, the products require a relatively large battery and can substantially achieve a service time of half a year only on the premise of passive triggering without active watching, causing inconvenience to installation and later maintenance.

SUMMARY

Technical solutions in embodiments of this application are implemented as follows:

An embodiment of this application provides a multimedia data processing method performed by an electronic device, the method including:
  receiving, in a first wireless communication frequency band, a wakeup instruction transmitted by a server through a wireless network transmission device;
  performing data acquisition on an environment of the electronic device according to the wakeup instruction, to obtain multimedia data; and
  transmitting the multimedia data to the wireless network transmission device in a second wireless communication frequency band, and then transmitting the multimedia data to a terminal through the wireless network transmission device, wherein communication frequencies of the first wireless communication frequency band are less than communication frequencies of the second wireless communication frequency band.

An embodiment of this application provides another multimedia data processing method performed by a server, the method including:
  transmitting a wakeup instruction to an electronic device through a wireless network transmission device in a first wireless communication frequency band, the wakeup instruction being used for triggering the electronic device to perform the following operations:
  performing data acquisition on an environment of the electronic device, to obtain multimedia data; and
  transmitting the multimedia data to the wireless network transmission device in a second wireless communication frequency band, and then transmitting the multimedia data to a terminal through the wireless network transmission device, frequencies of the first wireless communication frequency band being less than frequencies of the second wireless communication frequency band.

An embodiment of this application provides a multimedia data processing apparatus, including:
  a receiving module, configured to receive, in a first wireless communication frequency band, a wakeup instruction transmitted by a server through a wireless network transmission device;
  an acquisition module, configured to perform data acquisition on an environment of the electronic device according to the wakeup instruction, to obtain multimedia data; and
  a transmission module, configured to transmit the multimedia data to the wireless network transmission device in a second wireless communication frequency band, and then transmit the multimedia data to a terminal through the wireless network transmission device, frequencies of the first wireless communication frequency band being less than frequencies of the second wireless communication frequency band.

An embodiment of this application provides another multimedia data processing apparatus, including:
  a transmission module, configured to transmit a wakeup instruction to an electronic device through a wireless network transmission device in a first wireless communication frequency band, the wakeup instruction being used for triggering the electronic device to perform the following operations:
  performing data acquisition on an environment of the electronic device, to obtain multimedia data; and
  transmitting the multimedia data to the wireless network transmission device in a second wireless communication frequency band, and transmitting the multimedia data to a terminal through the wireless network transmission device, frequencies of the first wireless communication frequency band being less than frequencies of the second wireless communication frequency band.

An embodiment of this application provides an electronic device, including:
  a memory, configured to store executable instructions; and
  a processor, configured to implement, when executing the executable instructions stored in the memory, the multimedia data processing method provided in the embodiments of this application.

An embodiment of this application provides a non-transitory computer-readable storage medium, storing executable instructions, the executable instructions, when executed by a processor, causing the processor to implement the multimedia data processing method provided in the embodiments of this application.

BRIEF DESCRIPTION OF THE DRAWINGS

FIG. 5 is a schematic diagram of an interface of creating a video monitoring device on a cloud management console according to an embodiment of this application.

FIG. 6 is a schematic diagram of an interface of viewing a state of a video monitoring device on a cloud management console according to an embodiment of this application.

DESCRIPTION OF EMBODIMENTS

Figure 1:
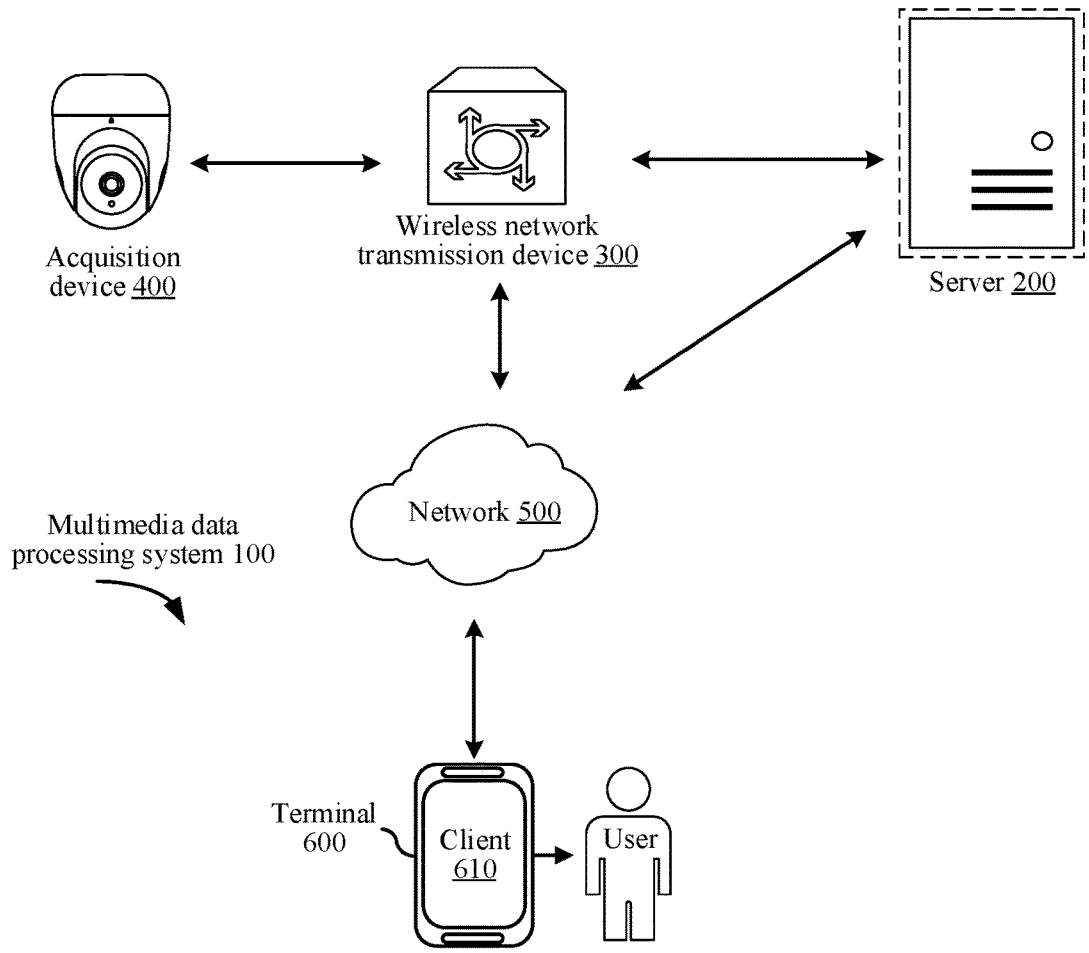
FIG. 1 is a schematic architectural diagram of a multimedia data processing system according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, a description is made on terms in the embodiments of this application, and the terms in the embodiments of this application are applicable to the following explanations.

(1) A first wireless communication frequency band refers to a communication frequency band corresponding to a frequency range less than a first preset frequency threshold, for example, Sub-1 GHz. Sub-1 GHz refers to a communication frequency less than 1 GHz used by a wireless communication system, and has advantages of a long communication distance and low power consumption, but has a relatively low transmission rate (about dozens to hundreds of Kbps).

(2) A second wireless communication frequency band refers to a communication frequency band corresponding to a frequency range greater than a second preset frequency threshold (the second preset frequency threshold is greater than the first preset frequency threshold), for example, 2.4 GHz. 2.4 GHz refers to a communication frequency band about 2.4 GHz used by the wireless communication system, is usually 2400 to 2483 MHz, is widely applied to wireless communication technologies such as Wi-Fi, Bluetooth, and ZigBee, and has an advantage of a relatively high communication rate of about dozens of Mbps, but has a short communication distance and high power consumption.

(3) A ping packet is a packet used for testing network connectivity.

(4) An acknowledge (ACK) packet is a packet of a receiving party in response to a connection initiating party when network connectivity is tested.

(5) An electronic device is a device configured to perform acquisition on an environment to obtain multimedia data, and may be, for example, a monitoring device, including a video monitoring device and an audio monitoring device.

With the development of cloud computing and popularization of intelligent hardware, because of advantages such as convenient installation, wiring-free, capability to remotely view through a terminal (for example, a mobile phone or a computer), and timely alarming, monitoring devices are widely applied to fields such as security and protection, and are mainly in such forms as a wiring-free network camera, a visual intercom doorbell, and an intelligent door lock with a camera.

However, the advantage of wiring-free correspondingly has a quite high requirement for power consumption of the monitoring device. Although currently some low-power wiring-free monitoring devices such as a Wi-Fi wireless intelligent electronic doorbell have appeared, the devices still require a relatively large battery and can substantially achieve a service time of half a year only on the premise of passive triggering without active watching, causing great inconvenience to installation and later maintenance.

For the foregoing problem, the related art provides two solutions as follows:

(1) A solution A provides a low-power wireless visual doorbell solution with a multi-split relay device. In the solution, when the relay device learns that an application stops playing a doorbell device, the relay device starts a sleep keepalive wakeup interaction part, and transmits a sleep instruction. After the doorbell device sleeps, a sleep keepalive packet is continuously transmitted to the relay device, and the relay device continues to intercept a keepalive packet, to determine whether the doorbell device is offline accordingly. Moreover, the relay device receives an instruction transmitted by a server, for example, a wakeup instruction, and wakes the low-power doorbell device up through a wakeup packet if the wakeup instruction is received.

(2) A solution B provides a split-type low-power monitoring system. In the system, it is proposed that a split-type triggering induction module and a low-power monitoring module are not disposed together, and work independent of each other and in cooperation with each other. Because the low-power monitoring module records a monitoring video only after receiving a monitoring triggering signal, the monitoring module does not need to be always working, which is energy saving and prolongs the standby time and service life of the system. Moreover, the monitoring module needs to form a network with the server through a low-power Wi-Fi module and/or a 4G networking module, and only the networking module works in a low power consumption state, and keeps a persistent connection to the server using a heartbeat packet.

However, it is found in the embodiments of this application that, the foregoing two solutions provided in the related art have the following problems:

(1) For the solution A, after the wireless visual doorbell device sleeps, the sleep keepalive packet still needs to be continuously transmitted to the relay device, which causes relatively high power consumption; moreover, if an inappropriate frequency band is selected to transmit a wireless signal, for example, if wireless communication is performed using Wi-Fi based on a frequency band of 2.4 GHz that is generally used for a wireless doorbell solution on the current market, relatively high power consumption is caused; and additionally, video data of the visual doorbell is transmitted to cloud through a repeater, and the repeater has a risk of being controlled and replicating the video data.

(2) For the solution B, because the persistent connection between the video monitoring module and the server is kept using a Wi-Fi or 4G persistent connection heartbeat packet, power consumption of the entire video monitoring module is excessively large.

In view of this, the embodiments of this application provide a multimedia data processing method and apparatus, an electronic device, and a non-transitory computer-readable storage medium, to greatly reduce power consumption of an electronic device, thereby improving endurance performance of the electronic device.

FIG. 1 is a schematic architectural diagram of a multimedia data processing system 100 according to an embodiment of this application. The multimedia data processing system 100 includes: a server 200, a wireless network transmission device 300, an electronic device 400 for data acquisition (also known as "acquisition device" in this application and only one electronic device is exemplarily shown in FIG. 1, and the quantity of electronic devices is not limited in actual application, and may be, for example, two or more), a network 500, and a terminal 600.

In an example, the multimedia data processing system may be applied to a monitoring scenario, for example, a video monitoring scenario or an audio monitoring scenario. A description is made by using an example in which a user monitors an environment through the electronic device 400, the electronic device 400 may be considered as a monitoring device, the user does not need to be always monitoring the environment, and if the electronic device is continuously running, unnecessary power consumption is caused. How to reduce unnecessary power consumption of the electronic device is described below.

As shown in FIG. 1, the electronic device 400 first broadcasts an access request in a first wireless communication frequency band (for example, a communication frequency band less than 1 GHz), so as to request, through the wireless network transmission device 300, the server 200 to perform access authentication on the electronic device 400. After the authentication succeeds, the server 200 returns an access authentication success result to the electronic device 400 in the first wireless communication frequency band through the wireless network transmission device 300. After receiving the access authentication success result, the electronic device 400 enters a first power consumption state (for example, a standby state, where the electronic device 400 disables an acquisition function in the first power consumption state). Then, the wireless network transmission device 300 probes a wireless communication environment, selects a communication parameter with relatively high quality (the communication parameter is used by the electronic device 400 to transmit multimedia data (including audio data and video data) to the wireless network transmission device 300 in a second wireless communication frequency band (for example, a communication frequency band of 2.4 GHz)), and transmits the selected communication parameter to the electronic device 400 in the first wireless communication frequency band. Subsequently, when intending to watch the multimedia data acquired by the electronic device 400, the user transmits a watching request through a client 610 running on the terminal 600. After receiving, through the network 500, the watching request transmitted by the client 610, the server 200 transmits a streaming request to the wireless network transmission device 300, so that the wireless network transmission device 300 transmits a wakeup instruction to the electronic device 400 in the first wireless communication frequency band. After receiving the wakeup instruction, the electronic device 400 enters a second power consumption state (for example, a working state), enables the acquisition function, and begins performing acquisition on the environment, to obtain multimedia data. Finally, the electronic device 400 transmits the acquired multimedia data to the wireless network transmission device 300 in the second wireless communication frequency band, so that the wireless network transmission device 300 transmits the received multimedia data to the terminal 600. After receiving the multimedia data, the terminal 600 performs rendering and invokes a graphics interface of the client 610 to perform display. When not intending to watch, the user may transmit a watching stop request to the server 200 through the client 610. After receiving the watching stop request transmitted by the client 610, the server 200 transmits a streaming stop request to the wireless network transmission device 300, to transmit a stop instruction to the electronic device 400 through the wireless network transmission device 300. After receiving the stop instruction, the electronic device 400 switches from the second power consumption state to the first power consumption state again, and regularly intercepts, in the first wireless communication frequency band, the wakeup instruction transmitted by the wireless network transmission device 300.

The server 200 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, big data, and an artificial intelligence (AI) platform. This is not limited in this application, and the quantity of servers is not limited either. The terminal 600 may be a smartphone, a tablet computer, a notebook computer, a desktop computer, a smart TV, a TV set-top box, an in-vehicle terminal, or the like.

In some embodiments, the multimedia data processing method provided in the embodiments of this application may be implemented with reference to an AI as a Service (AIaaS) technology.

AIaaS is a current mainstream service manner of an AI platform. Specifically, an AIaaS platform splits several types of common AI services, and provides an independent or packaging service at cloud. Such a service mode is similar to an AI theme mall, all developers may access and use one or more AI services provided in the platform in an application programming interface (API) manner, and some senior developers may further deploy, operate, and maintain their own exclusive cloud AI services using an AI framework and an AI infrastructure that are provided in the platform.

Exemplarily, the server 200 in FIG. 1 may be deployed as AIaaS, to provide services including registration and authentication of the wireless network transmission device 300 and the electronic device 400. For example, the user may perform registration for the wireless network transmission device 300 and the electronic device 400 in a user interface of the AIaaS, so that the AIaaS authenticates the wireless network transmission device 300 and the electronic device 400. Then, when needing to watch audio and video data, the user transmits a watching request to the AIaaS through the terminal 600, the AIaaS transmits, after receiving the watching request transmitted by the terminal 600, a streaming request to the wireless network transmission device 300, so that the wireless network transmission device 300 transmits a wakeup instruction to the electronic device 400 in the first communication frequency band. After receiving the wakeup instruction, the electronic device 400 enters a second power consumption state, and begins performing acquisition on the environment, to obtain multimedia data. Subsequently, the electronic device 400 transmits the acquired multimedia data to the wireless network transmission device 300 in the second communication frequency band, so that the wireless network transmission device 300 transmits the multimedia data to the AIaaS. Finally, after receiving the multimedia data, the AIaaS delivers the multimedia data to the terminal 600 that requests watching.

In some other embodiments, the multimedia data processing method provided in the embodiments of this application may also be implemented with reference to a blockchain technology.

Exemplarily, the electronic device 400, the wireless network transmission device 300, the server 200, and the terminal 600 shown in FIG. 1 may be added to a blockchain network to become nodes, where A type of the blockchain network is flexible and may be, for example, any one of a public chain, a private chain, or a consortium chain. After the electronic device 400 performs acquisition on an environment in response to the received wakeup instruction, to obtain multimedia data, an attempt to reach a consensus may be made, in a manner of executing a smart contract, at the multimedia data acquired by the electronic device 400, and after the consensus is reached, the multimedia data is forwarded to the terminal 600 through the wireless network transmission device 300. It can be seen that, the reaching the consensus on the multimedia data through the plurality of nodes in the blockchain network and then transmitting the multimedia data further improves security and reliability of the multimedia data.

Figure 2:
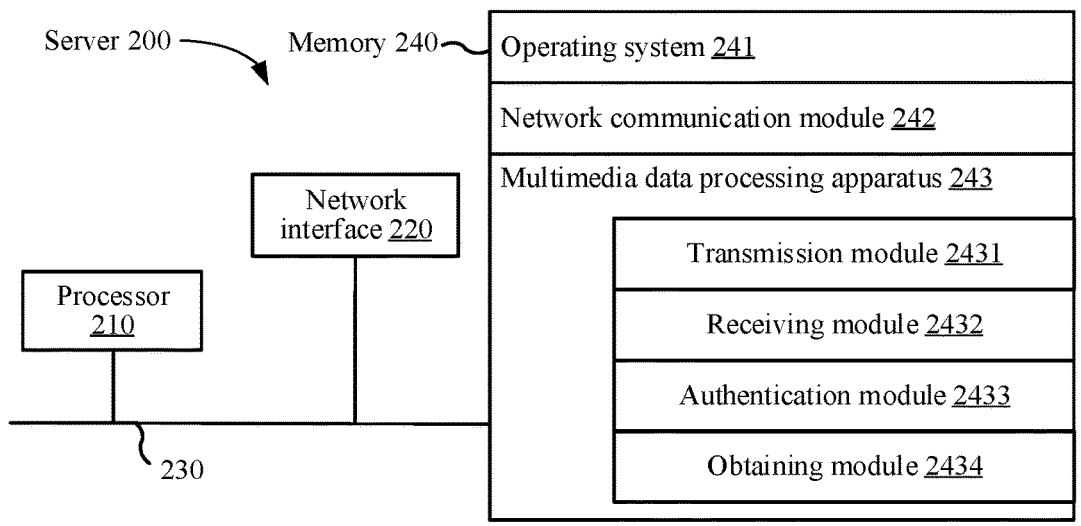
FIG. 2 is a schematic structural diagram of a server according to an embodiment of this application.

FIG. 2 is a schematic structural diagram of a server 200 according to an embodiment of this application. The server 200 shown in FIG. 2 includes: at least one processor 210, a memory 240, and at least one network interface 220. Components in the server 200 are coupled together by using a bus system 230. It may be understood that the bus system 230 is configured to implement connection and communication between the components. In addition to a data bus, the bus system 230 further includes a power bus, a control bus, and a status signal bus. However, for ease of clear description, all types of buses are marked as the bus system 230 in FIG. 2.

The processor 210 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The memory 240 may be a removable memory, a non-removable memory, or a combination thereof. Exemplary hardware devices include a solid-state memory, a hard disk drive, an optical disc driver, or the like. The memory 240 in some embodiments includes one or more storage devices physically away from the processor 210.

The memory 240 includes a volatile memory or a non-volatile memory, or may include a volatile memory and a non-volatile memory. The non-volatile memory may be a read-only memory (ROM), and the volatile memory may be a random access memory (RAM). The memory 240 described in this embodiment of this application is to include any other suitable type of memories.

In some embodiments, the memory 240 can store data to support various operations. Examples of the data include a program, a module, a data structure, or a subset or a superset thereof. The following provides descriptions by using examples.

An operating system 241 includes a system program configured to process various basic system services and perform a hardware-related task, for example, a framework layer, a core library layer, and a driver layer, and is configured to implement various basic services and process a hardware-related task.

A network communication module 242 is configured to reach another computing device through one or more (wired or wireless) network interfaces 220. Exemplary network interfaces 220 include: Bluetooth, wireless compatible authentication (Wi-Fi), a universal serial bus (USB), and the like.

In some embodiments, the multimedia data processing apparatus provided in the embodiments of this application may be implemented by using software. FIG. 2 shows a multimedia data processing apparatus 243 stored in the memory 240. The apparatus may be software in a form such as a program and a plug-in, and includes the following software modules: a transmission module 2431, a receiving module 2432, an authentication module 2433, and an obtaining module 2434. These modules are logical modules, and may be combined in different manners or further divided based on a function to be performed. The following describes a function of each module.

Figure 3:
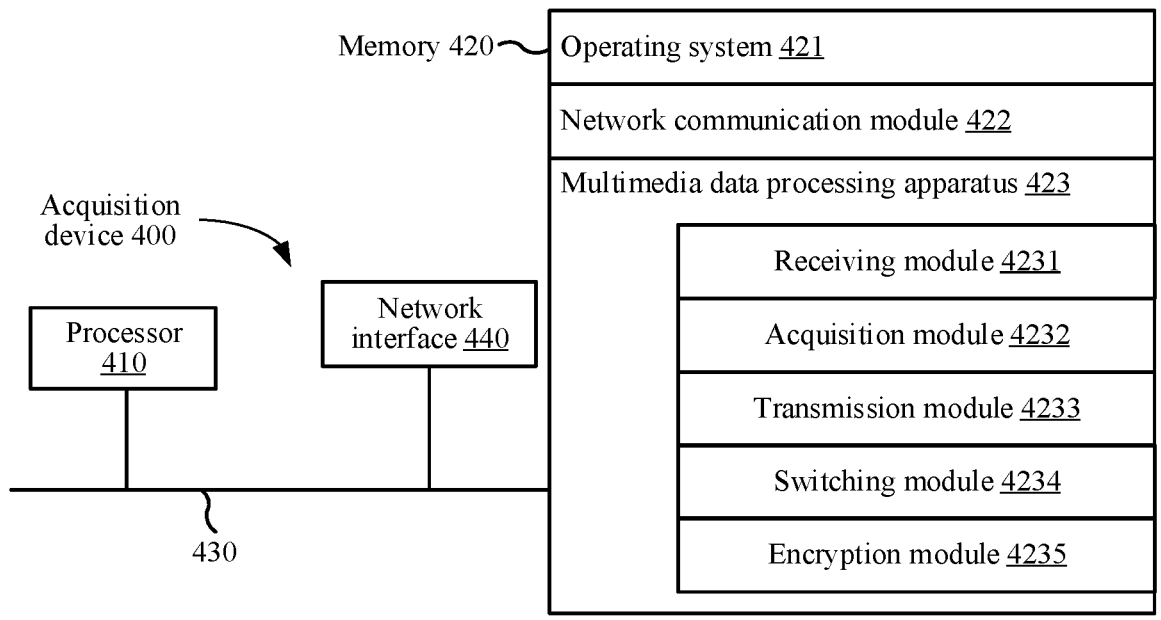
FIG. 3 is a schematic structural diagram of an electronic device according to an embodiment of this application.

FIG. 3 is a schematic structural diagram of an electronic device 400 according to an embodiment of this application. As shown in FIG. 3, the electronic device 400 includes: at least one processor 410, a memory 420 (including an operating system 421, a network communication module 422, and a multimedia data processing apparatus 423), a system bus 430, and a network interface 440. The multimedia data processing apparatus 423 stored in the memory 420 includes: a receiving module 4231, an acquisition module 4232, a transmission module 4233, a switching module 4234, and an encryption module 4235. These modules are logical modules, and may be combined in different manners or further divided based on a function to be performed. The following describes a function of each module.

The multimedia data processing method provided in the embodiments of this application is described below with reference to the accompanying drawings.

Figure 4A:
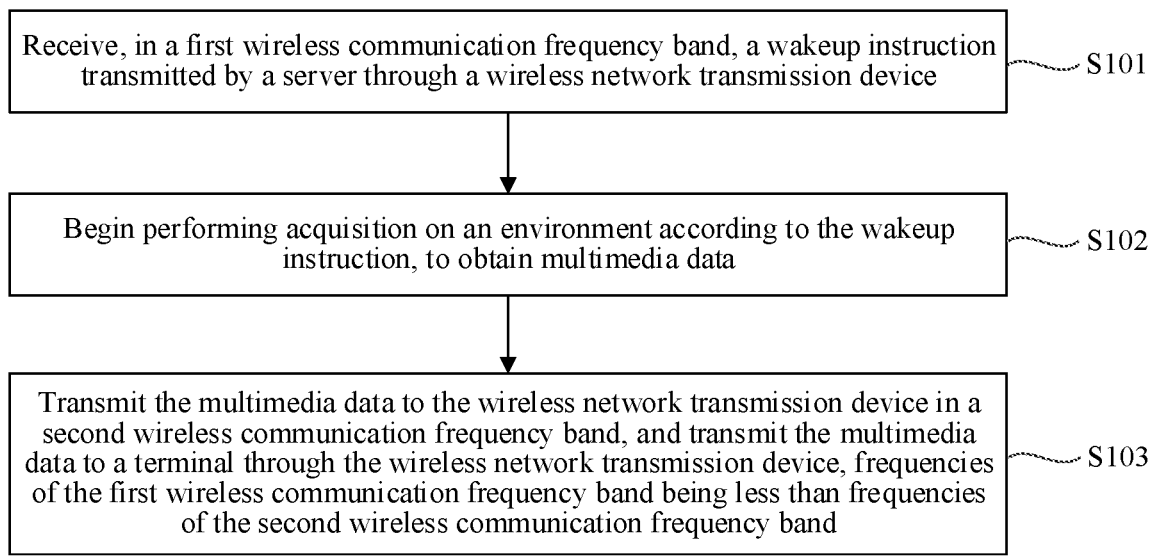
FIG. 4A is a schematic flowchart of a multimedia data processing method according to an embodiment of this application.

FIG. 4A is a schematic flowchart of a multimedia data processing method according to an embodiment of this application. A description is made with reference to steps shown in FIG. 4A. Step S101. An electronic device receives, in a first wireless communication frequency band, a wakeup instruction transmitted by a server through a wireless network transmission device. Step S102. The electronic device begins performing data acquisition on an environment of the electronic device according to the wakeup instruction, to obtain multimedia data. Step S103. The electronic device transmits the multimedia data to the wireless network transmission device in a second wireless communication frequency band, and transmits the multimedia data to a terminal through the wireless network transmission device, frequencies of the first wireless communication frequency band being less than frequencies of the second wireless communication frequency band. In this way, based on a dual-band communication mechanism, the wakeup instruction is intercepted through the first wireless communication frequency band (that is, low frequency band), and the multimedia data is transmitted through the second wireless communication frequency band (that is, high frequency band), which may greatly reduce power consumption of the electronic device, thereby improving endurance performance of the electronic device.

The multimedia data processing method provided in the embodiments of this application is described below from the perspective of interaction between a server, a wireless network transmission device, an electronic device, and a terminal.

Figure 4B:
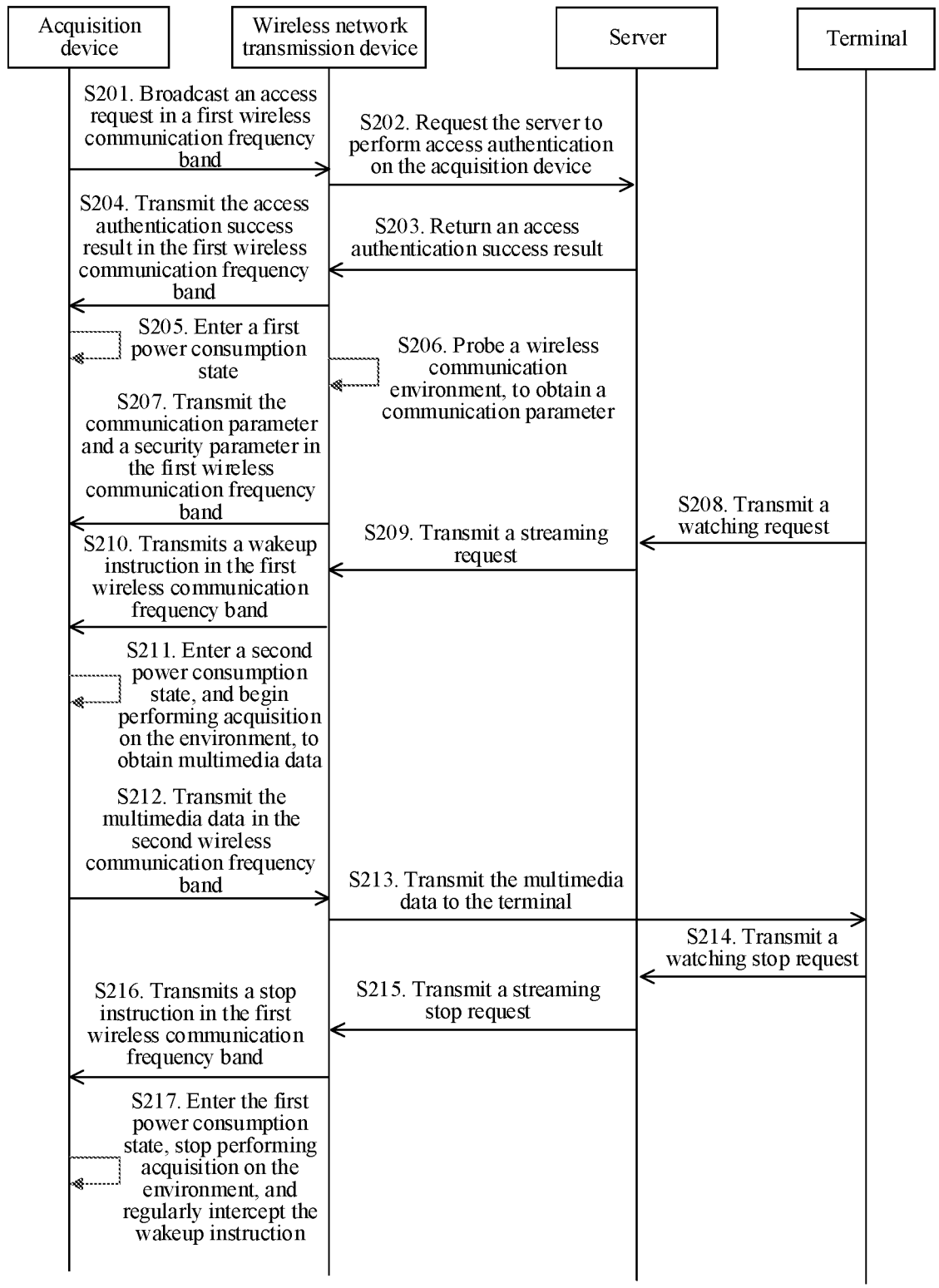
FIG. 4B is a schematic flowchart of a multimedia data processing method according to an embodiment of this application.

FIG. 4B is a schematic flowchart of a multimedia data processing method according to an embodiment of this application. A description is made with reference to steps shown in FIG. 4B.

Step S201. An electronic device broadcasts an access request in a first wireless communication frequency band.

The electronic device may be a monitoring device, including an audio electronic device (for example, a microphone or microphone array), a video electronic device (for example, a camera or an intelligent doorbell with a camera), and the like. Exemplarily, when the electronic device is a video electronic device, forms corresponding to the electronic device may include a wiring-free network camera, a visual doorbell, an intelligent door lock with a camera, and the like. The first wireless communication frequency band (may also be referred to as a low frequency band) refers to a communication frequency band corresponding to a frequency range less than a first preset frequency. For example, a communication frequency band whose communication frequencies are less than 1 GHz may be used as the first wireless communication frequency band of the embodiments of this application.

Exemplarily, using an example in which the electronic device is a video electronic device, the video electronic device may broadcast an access request in a communication frequency band (for example, 433 MHz, or 470 MHz) less than 1 GHz, so that after receiving the access request transmitted through a wireless network transmission device, a server performs access authentication on the video electronic device.

Step S202. The wireless network transmission device requests, after receiving the access request broadcast by the electronic device, the server to perform access authentication on the electronic device.

The wireless network transmission device used as a bridge between the electronic device and the server is configured to forward the access request broadcast by and the multimedia data acquired by the electronic device, and configured to forward an authentication result, a wakeup instruction, a stop instruction, and the like that are transmitted by the server. Exemplarily, the wireless network transmission device may be a network device such as a gateway, a router, or a switch.

In some embodiments, the wireless network transmission device may request the server to perform access authentication on the electronic device in the following manner: The electronic device broadcasts the access request in the first wireless communication frequency band, and after intercepting the access request broadcast by the electronic device, the wireless network transmission device requests, from the server, a challenge code used for authenticating the electronic device. The server generates the challenge code, and returns the challenge code to the wireless network transmission device. The wireless network transmission device transmits, in the first wireless communication frequency band, the challenge code generated by the server to the electronic device. After receiving the challenge code transmitted by the wireless network transmission device, the electronic device encrypts the challenge code according to a local key of the electronic device or a key obtained from the server, to obtain a security authentication code. Subsequently, the electronic device transmits the security authentication code to the wireless network transmission device in the first wireless communication frequency band, and the wireless network transmission device transmits the received security authentication code to the server, so as to request the server to perform access authentication on the electronic device through the security authentication code.

Exemplarily, using an example in which the electronic device is a video electronic device and the wireless network transmission device is a gateway, the video electronic device transmits a broadcast request for accessing the server through a low-band communication frequency considered by default together with the gateway, for example, 433 MHz. After receiving the access request transmitted by the video electronic device, the gateway requests, from the server, the challenge code used for authenticating an identity of the video electronic device (also referred to as a challenge password, referring to an encrypted password generated in compliance with the Challenge Handshake Authentication Protocol (CHAP) and used for ensuring that a real password of the user is not leaked in a transmission process), and after receiving the access request forwarded by the gateway, the server generates the corresponding challenge code and returns the challenge code to the gateway. Then, the gateway transmits the challenge code returned by the server to the video electronic device through the foregoing communication frequency of 433 MHz. After receiving the challenge code, the video electronic device converts the challenge code into the security authentication code through calculation according to a key that is preset in the video electronic device or obtained from the server. Subsequently, the video electronic device transmits the calculated security authentication code to the gateway still through the foregoing communication frequency of 433 MHz, so that the gateway transmits the security authentication code to the server for verification.

In some other embodiments, after receiving the access request transmitted by the wireless network transmission device, the server first needs to perform verification on the identity of the wireless network transmission device, so as to generate, for the access request after the verification succeeds, the challenge code used for authenticating the identity of the electronic device.

Exemplarily, using an example in which the server is a cloud platform, the user also needs to register the gateway while registering the video electronic device in a man-machine interaction interface of the cloud platform. Then, the cloud platform generates corresponding key files for the video electronic device and the gateway respectively, and burns the generated key files into the video electronic device and the gateway respectively. When receiving a control instruction transmitted by the gateway (for example, an access request), the cloud platform first authenticates the identity of the gateway based on the key file (for example, determines, through comparison, whether the key file burned in the gateway and carried in the authentication request is consistent with the key file stored in the cloud platform), and performs a corresponding subsequent operation after the authentication succeeds (that is, it is determined through comparison that the key files are consistent). When the authentication fails (that is, it is determined through comparison that the key files are inconsistent), the cloud platform rejects the request, and returns a corresponding reminding message to the gateway.

Step S203. The server returns an access authentication success result to the wireless network transmission device when the authentication succeeds according to the access request.

In some embodiments, following the above, after receiving the security authentication code calculated by the electronic device according to the key and transmitted through the wireless network transmission device, the server performs verification on the identity of the electronic device according to the security authentication code.

Exemplarily, after receiving the security authentication code, the server decrypts the security authentication code using the key, to obtain the challenge code, and then the server determines, through comparison, whether the decrypted challenge code is consistent with the challenge code generated in step S202. When the two challenge codes are consistent, the authentication succeeds, and the server returns the access authentication success result to the wireless network transmission device. When the two challenge codes are inconsistent, the authentication fails, and the server may return an access authentication failure result to the wireless network transmission device, so that when receiving the access authentication failure result, the electronic device transmits the access request to the server again.

Step S204. The wireless network transmission device transmits the access authentication success result to the electronic device in the first wireless communication frequency band.

After receiving the access authentication success result returned by the server, the wireless network transmission device transmits, to the electronic device in the first wireless communication frequency band, the access authentication success result returned by the server.

Exemplarily, using an example in which the wireless network transmission device is a gateway, after receiving the access authentication success result returned by the server, the gateway returns the access authentication success result to the video electronic device through the low-band communication frequency considered jointly by the video electronic device and the gateway by default in step S202.

Step S205. The electronic device enters a first power consumption state, where the electronic device disables an acquisition function in the first power consumption state.

After receiving the access authentication success result, the electronic device enters the first power consumption state, and in the first power consumption state, the electronic device disables the acquisition function, that is, in the first power consumption state, the electronic device is in a standby state, and regularly intercepts a wakeup instruction transmitted by the wireless network transmission device. The electronic device enters a second power consumption state after receiving the wakeup instruction, and in the second power consumption state, the electronic device enables the acquisition function, and begins performing acquisition on an environment, to obtain multimedia data. In this way, when not needing to work, the electronic device automatically enters a low-power standby state, which can save power consumption of the electronic device and increase use duration of the electronic device.

In some embodiments, after entering the first power consumption state, the electronic device may further perform the following operation: receiving, in the first wireless communication frequency band, a ping request transmitted by the wireless network transmission device. After receiving the ping request, the electronic device transmits an acknowledge message of the ping request to the wireless network transmission device in the first wireless communication frequency band, so that after receiving the acknowledge message, the wireless network transmission device transmits a keepalive heartbeat message to the server, where the keepalive heartbeat message is used for indicating to the server that the electronic device is in an online state.

Exemplarily, after entering the first power consumption state, the video electronic device regularly intercepts, in a low frequency band, a ping packet transmitted by the gateway, and returns, after receiving the ping packet transmitted by the gateway, an ACK packet to the gateway in the low frequency band, so that after receiving the ACK packet returned by the video electronic device, the gateway transmits a keepalive heartbeat packet to the server, to inform the server of the online state of the video electronic device. If the server has not received, in a specific duration (for example, two hours), the keepalive heartbeat packet transmitted by the gateway, it may be recorded that the video electronic device is in an offline state.

Step S206. The wireless network transmission device probes a wireless communication environment, to obtain a communication parameter, where the communication parameter is used by the electronic device to transmit the acquired multimedia data to the wireless network transmission device in a second wireless communication frequency band.

The second wireless communication frequency band (also referred to as a high frequency band) refers to a communication frequency band corresponding to a frequency range greater than a second preset frequency. For example, a communication frequency of 2.4 GHz or 5.8 GHz may be used as a frequency sub-band of the second wireless communication frequency band in the embodiments of this application. The communication parameter may include: parameters such as a communication frequency included in the second wireless communication frequency band and an address of the wireless network transmission device.

Exemplarily, following the above, still using an example in which the wireless network transmission device is a gateway, the gateway probes quality of the wireless environment in the current high frequency band, and selects a high-band communication frequency with relatively good communication quality. For example, the gateway selects a communication frequency band of 2.4 GHz as a communication frequency subsequently used for transmitting the multimedia data. Then, the gateway transmits a packet such as a ping packet to the video electronic device through the low frequency band, where the packet carries the high-band communication frequency selected by the gateway, a gateway address, and an authentication code. After receiving the ping packet transmitted by the gateway, the video electronic device parses the ping packet, to obtain and store the high-band communication frequency, the gateway address, and the authentication code.

In some embodiments, after receiving, in the first wireless communication frequency band, the communication parameter transmitted by the wireless network transmission device, the electronic device may further perform the following operation: receiving, in the first wireless communication frequency band, an updated communication parameter transmitted by the wireless network transmission device, where the updated communication parameter is obtained after the wireless network transmission device probes the quality of the wireless communication environment and updates the transmitted communication parameter according to a probing result.

Exemplarily, using an example in which the wireless network transmission device is a gateway, the gateway periodically probes quality of a high-band wireless environment. When it is probed that the previously selected high-band communication frequency has poorer communication quality, or a high-band communication frequency with better quality is probed, the gateway updates the high-band communication frequency as required, and transmits the updated high-band communication frequency to the video electronic device through the low frequency band.

Selection of frequency ranges corresponding to the first wireless communication frequency band (that is, the low frequency band) and the second wireless communication frequency band (that is, the high frequency band) in the embodiments of this application are not limited to the foregoing embodiments. It may be understood that, the first wireless communication frequency band may also include a frequency band of about 1 GHz, and the second wireless communication frequency band may further include a frequency band above 5.8 GHz. Targeted selection may be made according to power consumption advantages and transmission rate advantages of different frequency bands. This is not limited in the embodiments of this application.

Step S207. The wireless network transmission device transmits the communication parameter and a security parameter in the first wireless communication frequency band, where the security parameter is used for encrypting the transmitted multimedia data, and is obtained through a negotiation between the server and the electronic device.

The security parameter includes a locally stored key of the electronic device or a key generated by the server for the electronic device. The key includes a symmetric key (for example, a data encryption algorithm, an advanced encryption standard, or a triple data encryption algorithm) and an asymmetric key (for example, a discrete logarithm or an elliptic curve). When the key is a symmetric key, the same key is used for encryption processing and decryption processing, that is, the key used by the electronic device to encrypt the multimedia data and the key used by the server to decrypt the multimedia data are the same key. When the key is an asymmetric key, different keys are used for encryption processing and decryption processing. For example, the electronic device encrypts the multimedia data using a public key in the key file, and when receiving the encrypted multimedia data, the server decrypts the encrypted multimedia data using a corresponding private key.

Exemplarily, a key that is generated autonomously on the side of the video electronic device or depends on an internal component of the video electronic device, for example, a security chip may be used as the key obtained through the negotiation between the server and the video electronic device, and the subsequently transmitted multimedia data is encrypted using the key.

Exemplarily, when the video electronic device is registered, the server may generate a corresponding key for the video electronic device, and burn the key into the video electronic device, so that the video electronic device encrypts the subsequently transmitted multimedia data using the key.

In this embodiment of this application, the security parameter is obtained through a direct negotiation between the server and the electronic device. For the multimedia data processing system with such an intermediate link as the wireless network transmission device, when the multimedia data flows through the wireless network transmission device, there is no risk of decrypting the data, thereby protecting privacy security of the user data.

Step S208. A terminal transmits a watching request to the server.

When intending to watch the multimedia data acquired by the electronic device, the user may transmit the watching request to the server through a client running on the terminal.

Exemplarily, a corresponding application (APP) is installed on the terminal of the user, and when intending to watch audio and video data acquired by the video electronic device, the user may transmit a watching request message to the server by operating the APP.

Step S209. The server transmits, after receiving the watching request transmitted by terminal, a streaming request to the wireless network transmission device.

The server transmits, after receiving the watching request message transmitted by the user through the APP installed on the terminal, the streaming request to the wireless network transmission device, so as to wake the electronic device up through the wireless network transmission device.

Exemplarily, after receiving the watching request transmitted by the terminal, the server transmits the streaming request to the gateway, so as to wake the video electronic device up through the gateway, so that the video electronic device enables a monitoring and acquisition function, and begins performing monitoring and acquisition on the environment, to obtain multimedia data.

Step S210. The wireless network transmission device transmits a wakeup instruction to the electronic device in the first wireless communication frequency band.

After receiving the streaming request transmitted by the server, the wireless network transmission device transmits the wakeup instruction to the electronic device in the first wireless communication frequency band, so that the electronic device enables the monitoring and acquisition function, and begins performing monitoring and acquisition on the environment.

Exemplarily, after receiving the streaming request transmitted by the server, the gateway transmits the wakeup instruction to the video electronic device on the low-band communication frequency, so that the video electronic device enables the monitoring and acquisition function, and begins performing monitoring and acquisition on the environment.

Step S211. The electronic device enters a second power consumption state, and begins performing acquisition on the environment, to obtain multimedia data.

After receiving the wakeup instruction, the electronic device switches from the first power consumption state to the second power consumption state, and in the second power consumption state, the electronic device enables the acquisition function, and begins performing acquisition on the environment, to obtain the multimedia data.

Exemplarily, using an example in which the electronic device is a video electronic device, after receiving the wakeup instruction transmitted by the gateway, the video electronic device switches from a standby state (that is, the first power consumption state) to a working state (that is, the second power consumption state, in which power consumption is greater than power consumption in the first power consumption state), and begins performing monitoring and acquisition on an environment (for example, an office or a bedroom), to obtain corresponding multimedia data (including audio data and video data).

Step S212. The electronic device transmits the acquired multimedia data to the wireless network transmission device in the second wireless communication frequency band.

In some embodiments, the electronic device may transmit the multimedia data to the wireless network transmission device in the second wireless communication frequency band in the following manner: encrypting the multimedia data according to the key, to obtain encrypted multimedia data; and transmitting the encrypted multimedia data on the communication frequency, where a destination address of the encrypted multimedia data is the address of the wireless network transmission device.

Exemplarily, using an example in which the wireless network transmission device is a gateway, after acquiring the multimedia data, the video electronic device first encrypts the multimedia data using the key obtained in step S207, to obtain encrypted multimedia data. Subsequently, the video electronic device transmits a packet on the high-band communication frequency according to the high-band communication frequency and the gateway address that are stored in step S206, where the packet carries the encrypted multimedia data, and a destination address of the packet is the address of the gateway.

In some other embodiments, before transmitting the multimedia data to the wireless network transmission device in the second wireless communication frequency band, the electronic device may further first perform the following operation: broadcasting a parameter request in a default wireless communication frequency band of the wireless network transmission device, and receiving a communication parameter in the default wireless communication frequency band, where the communication parameter is broadcast by the wireless network transmission device in the default wireless communication frequency band in response to the parameter request, and the default wireless communication frequency band is a frequency band in which the wireless network transmission device performs interception by default.

Exemplarily, using an example in which the wireless network transmission device is a router, after receiving the wakeup instruction, the video electronic device broadcasts a parameter request in a wireless communication frequency band (for example, 2.4 GHz) considered by the router by default. After receiving the parameter request broadcast by the video electronic device, the router returns the communication parameter (for example, address information of the router and a frequency sub-band of the default wireless communication frequency band used as the second wireless communication frequency band) to the video electronic device in the default wireless communication frequency band, so that the video electronic device transmits a packet carrying the encrypted multimedia data in the default wireless communication frequency band, and a destination address of the packet is an address of the router.

In some other embodiments, the electronic device may alternatively transmit a packet in another high-band communication frequency different from the default wireless communication frequency instead of transmitting a packet on the wireless communication frequency considered by the wireless network transmission device by default.

Exemplarily, following the above, the communication parameter returned by the router to the video electronic device may include another high-band communication frequency different from the default wireless communication frequency band, so that the video electronic device subsequently transmits a packet on the another high-band communication frequency.

Step S213. The wireless network transmission device transmits the multimedia data to the terminal.

In some embodiments, the wireless network transmission device may transmit the multimedia data acquired by the electronic device to the terminal in the following manner: directly transmitting, when the wireless network transmission device has established a communicative connection with the terminal, the multimedia data to the terminal through the communicative connection; and transmitting, when the wireless network transmission device has not established a communicative connection with the terminal, the multimedia data to the server, and transmitting, through the server, the multimedia data acquired by the electronic device to the terminal.

Exemplarily, using an example in which the wireless network transmission device is a gateway, after receiving the watching request transmitted by the terminal, the server obtains network parameters of the terminal, including parameters such as a public network IP address and a port of the terminal, and obtains network parameters of the gateway, including parameters such as a public network IP address and a port of the gateway. Then, the server attempts, according to the network parameters of the terminal and the network parameters of the gateway, to directly establish a communicative connection between the gateway and the terminal. When the communicative connection between the gateway and the terminal is established successfully, the gateway may directly transmit, after receiving the multimedia data transmitted by the video electronic device, the multimedia data to the terminal; and when the communicative connection between the gateway and the terminal is established unsuccessfully, the gateway transmits the multimedia data to the server, and the server forwards the multimedia data to the terminal.

Step S214. The terminal transmits a watching stop request to the server.

When not intending to continue watching the multimedia data acquired by the electronic device, the user may transmit the watching stop request to the server through the client running on the terminal.

Exemplarily, a user application interface may display a similar "stop play" button, and after the user clicks the "stop playing" button, the terminal transmits a watching stop request message to the server.

Step S215. The server transmits a streaming stop request to the wireless network transmission device.

Exemplarily, after receiving the watching stop request message transmitted by the terminal, the server transmits the streaming stop request to the wireless network transmission device, to transmit a stop instruction to the electronic device through the wireless network transmission device, so that the electronic device stops performing acquisition on the environment, and enters the first power consumption state (that is, standby state) again.

Step S216. The wireless network transmission device transmits a stop instruction in the first wireless communication frequency band.

Exemplarily, using an example in which the wireless network transmission device is a gateway, after receiving the streaming stop request transmitted by the server, the gateway transmits a monitoring stop instruction to the video electronic device on the low-band communication frequency, so that the video electronic device enters the standby state again.

Step S217. The electronic device enters the first power consumption state, stops performing acquisition on the environment, and regularly intercepts the wakeup instruction transmitted through the wireless network transmission device.

After receiving the stop instruction transmitted by the wireless network transmission device, the electronic device switches from the second power consumption state to the first power consumption state, stops performing acquisition on the environment, and regularly intercepts, in the first wireless communication frequency band, the wakeup instruction transmitted by the wireless network transmission device.

Exemplarily, after receiving the monitoring stop instruction transmitted by the gateway, the video electronic device switches back to the standby state from the working state, stops performing monitoring and acquisition on the environment, and stops transmitting the multimedia data to the gateway on the high-band communication frequency. Subsequently, the video electronic device again regularly intercepts, on the low-band communication frequency, the wakeup instruction transmitted through the gateway, so as to again perform the foregoing step S211 to step S213 after receiving the wakeup instruction.

In the multimedia data processing method provided in this embodiment of this application, based on dual-band communication, respective advantages of different communication frequency bands in power consumption and transmission rate are maximally used (that is, an instruction is regularly intercepted in the low frequency band, and multimedia data is transmitted in the high frequency band), which may greatly increase service time of the electronic device, thereby improving maintainability and user experience of the electronic device. Moreover, the server and the electronic device directly negotiate the security parameter. For the low-power monitoring system with such an intermediate link as the wireless network transmission device, when the multimedia data acquired by the electronic device flows through the wireless network transmission device, there is no risk of decrypting the data, thereby protecting privacy security of the user data.

An exemplary structure of the multimedia data processing apparatus 243 provided in the embodiments of this application and implemented as software modules continues to be described below. In some embodiments, as shown in FIG. 2, software modules in the multimedia data processing apparatus 243 stored in the memory 240 may include: a transmission module 2431, a receiving module 2432, an authentication module 2433, and an obtaining module 2434.

The transmission module 2431 is configured to transmit a wakeup instruction to an electronic device through a wireless network transmission device in a first wireless communication frequency band, the wakeup instruction being used for triggering the electronic device to perform the following operations: performing data acquisition on an environment of the electronic device, to obtain multimedia data; and transmitting the multimedia data to the wireless network transmission device in a second wireless communication frequency band, and transmitting the multimedia data to a terminal through the wireless network transmission device, frequencies of the first wireless communication frequency band being less than frequencies of the second wireless communication frequency band.

In some embodiments, the receiving module 2432 is configured to receive, in the first wireless communication frequency band, an access request transmitted by the electronic device through the wireless network transmission device; the authentication module 2433 is configured to perform authenticates the electronic device according to the access request; and the transmission module 2431 is configured to transmit, when the electronic device is authenticated successfully according to the access request, an access authentication success result to the electronic device through the wireless network transmission device in the first wireless communication frequency band, where the access authentication success result is used for triggering the electronic device to enter a first power consumption state, where the electronic device disables an acquisition function in the first power consumption state.

In some embodiments, the transmission module 2431 is configured to transmit a stop instruction to the electronic device through the wireless network transmission device, where the stop instruction being used for triggering the electronic device to perform the following operations: switching from the second power consumption state to the first power consumption state, and regularly intercepting, in the first wireless communication frequency band, the wakeup instruction transmitted by the wireless network transmission device, where the electronic device disables an acquisition function in the first power consumption state, and the electronic device enables the acquisition function in the second power consumption state.

In some embodiments, the obtaining module 2434 is configured to obtain network parameters of the terminal and obtain network parameters of the wireless network transmission device; attempt, according to the network parameters of the terminal and the network parameters of the wireless network transmission device, to establish a communicative connection between the terminal and the wireless network transmission device; and transmit, when no communicative connection is successfully established and multimedia data transmitted by the wireless network transmission device is received, the multimedia data to the terminal.

In some other embodiments, as shown in FIG. 3, software modules in the multimedia data processing apparatus 423 stored in the memory 420 may include: a receiving module 4231, an acquisition module 4232, a transmission module 4233, a switching module 4234, and an encryption module 4235.

The receiving module 4231 is configured to receive, in a first wireless communication frequency band, a wakeup instruction transmitted by a server through a wireless network transmission device; the acquisition module 4232 is configured to begin performing acquisition on an environment according to the wakeup instruction, to obtain multimedia data; and the transmission module 4233, configured to transmit the multimedia data to the wireless network transmission device in a second wireless communication frequency band, and transmit the multimedia data to a terminal through the wireless network transmission device, frequencies of the first wireless communication frequency band being less than frequencies of the second wireless communication frequency band.

In some embodiments, the receiving module 4231 is configured to receive, in the first wireless communication frequency band, a communication parameter and a security parameter that are transmitted by the wireless network transmission device.

In some embodiments, the communication parameter includes: a communication frequency included in the second wireless communication frequency band, and an address of the wireless network transmission device; the security parameter includes: a locally stored key of the electronic device or a key obtained from the server; the encryption module 4235 is configured to encrypt the multimedia data according to the key, to obtain encrypted multimedia data; and the transmission module 4233 is configured to transmit the encrypted multimedia data on the communication frequency, where a destination address of the encrypted multimedia data is the address of the wireless network transmission device.

In some embodiments, the receiving module 4231 is configured to receive, in the first wireless communication frequency band, an updated communication parameter transmitted by the wireless network transmission device, where the updated communication parameter is obtained after the wireless network transmission device probes the quality of the wireless communication environment and updates the transmitted communication parameter according to a probing result.

In some embodiments, the transmission module 4233 is configured to request, through the wireless network transmission device in the first wireless communication frequency band, the server to perform access authentication on the electronic device; and the receiving module 4231 is configured to enter a first power consumption state when an access authentication success result transmitted by the server is received in the first wireless communication frequency band, where the electronic device disables an acquisition function in the first power consumption state.

In some embodiments, the transmission module 4233 is configured to transmit an access request to the wireless network transmission device in the first wireless communication frequency band, where the access request is used for triggering the wireless network transmission device to request, from the server, a challenge code used for authenticating the electronic device; the receiving module 4231 is configured to receive, in the first wireless communication frequency band, the challenge code transmitted by the server through the wireless network transmission device; the encryption module 4235 is configured to encrypt the challenge code according to a locally stored key of the electronic device or a key obtained from the server, to obtain a security authentication code; and the transmission module 4233 is configured to transmit the security authentication code to the wireless network transmission device in the first wireless communication frequency band, where the security authentication code is used for requesting the server to perform access authentication on the electronic device through the security authentication code.

In some embodiments, the receiving module 4231 is configured to receive, in the first wireless communication frequency band, a ping request transmitted by the wireless network transmission device; and the transmission module 4233 is configured to transmit an acknowledge message of the ping request to the wireless network transmission device in the first wireless communication frequency band, where the acknowledge message is used for triggering the wireless network transmission device to transmit a keepalive heartbeat message to the server, where the keepalive heartbeat message is used for indicating to the server that the electronic device is in an online state.

In some embodiments, the switching module 4234 is configured to switch from a first power consumption state to a second power consumption state according to the wakeup instruction, where the electronic device disables an acquisition function in the first power consumption state, and the electronic device enables the acquisition function in the second power consumption state; and the acquisition module 4232 is configured to perform acquisition on the environment in the second power consumption state, to obtain multimedia data, where a type of the multimedia data includes at least one of the following: a video and an audio.

In some embodiments, the transmission module 4233 is configured to transmit, when the wireless network transmission device has established a communicative connection with the terminal, the multimedia data to the terminal through the communicative connection; and configured to transmit, when the wireless network transmission device has not established a communicative connection with the terminal, the multimedia data to the terminal through the wireless network transmission device and the server.

In some embodiments, the receiving module 4231 is configured to switch from a second power consumption state to a first power consumption state when a monitoring stop instruction transmitted by the server through the wireless network transmission device is received, and regularly intercept, in the first wireless communication frequency band, the wakeup instruction transmitted by the wireless network transmission device, where the electronic device disables an acquisition function in the first power consumption state, and the electronic device enables the acquisition function in the second power consumption state.

In some embodiments, the transmission module 4233 is configured to broadcast a parameter request in a default wireless communication frequency band of the wireless network transmission device, where the default wireless communication frequency band is a frequency band in which the wireless network transmission device performs interception by default; and the receiving module 4231 is configured to receive a communication parameter in the default wireless communication frequency band, where the communication parameter is broadcast by the wireless network transmission device in the default wireless communication frequency band in response to the parameter request.

In some embodiments, the communication parameter includes at least one of the following: the second wireless communication frequency band, where the default wireless communication frequency band is a frequency sub-band of the second wireless communication frequency band; and an address of the wireless network transmission device; and the transmission module 4233 is configured to transmit the multimedia data in the default wireless communication frequency band, where a destination address of the multimedia data is the address of the wireless network transmission device.

Descriptions of the apparatus of this embodiment of this application are similar to the descriptions of the method embodiments. The apparatus embodiments have beneficial effects similar to those of the method embodiments and thus are not repeatedly described. Technical details not exhausted in the multimedia data processing apparatus provided in this embodiment of this application may be understood according to descriptions of FIG. 4A or FIG. 4B.

The following describes an exemplary application of this embodiment of this application in an actual application scenario using an example in which the electronic device is a video monitoring device, the wireless network transmission device is a wireless gateway (briefly referred to as a gateway below), and the server is a cloud platform.

With the development of cloud computing and popularization of intelligent hardware, because of advantages such as convenient installation, wiring-free, capability to remotely view through a mobile phone, and timely alarming, low-power video monitoring devices are widely applied to the field of security and protection, and are mainly in such forms as a wiring-free network camera, a visual intercom doorbell, and an intelligent door lock with a camera. The advantage of wiring-free (for example, a power cable and a network cable) correspondingly has a quite high requirement for power consumption of the video monitoring device. Although some similar wiring-free video monitoring products such as a Wi-Fi intelligent electronic doorbell have appeared on the market, the products require a relatively large battery and can substantially achieve a service time of half a year only on the premise of passive triggering without active watching, causing inconvenience to installation and later maintenance.

In view of this, an embodiment of this application provides a multimedia data processing method, where based on a dual-band communication mechanism, a communication parameter and a security parameter that are required for high-band (for example, 2.4 GHz) communication are transmitted using a low-band channel (for example, Sub-1 GHz). A video monitoring device regularly intercepts, in a low frequency band, a ping packet transmitted by a gateway to a device, parses content of the ping packet, and stores a communication parameter and a security parameter that are required for subsequent high-band communication. When an APP running on an intelligent terminal needs to obtain audio and video data, a cloud platform transmits a wakeup instruction to the video monitoring device in the low frequency band through the gateway, and the video monitoring device communicates with the gateway in a high frequency band directly using the stored high-band communication parameter and security parameter, and transmits a video stream and an audio stream.

The multimedia data processing method provided in this embodiment of this application makes full use of advantages of low power consumption and a high high-band communication rate of low-band communication, to achieve a system characteristic of ultra-low power consumption and a channel-unrelated security characteristic. Pictures of the video monitoring device are actively watched on cloud. In addition, the service time of the video monitoring device is greatly prolonged, to facilitate later maintenance work of the user.

Exemplarily, test data of a current mainstream radio frequency chip on the market shows that, power consumption of a radio frequency part of a Sub-1 GHz chip during interception is about 5 mA, and transmit power consumption is 32 mA@15 dBm; and power consumption of a radio frequency part of a 2.4 GHz Wi-Fi chip during interception is about 60 mA, and transmit power consumption is 140 mA@15 dBm. Therefore, it can be seen that, interception power consumption in the low frequency band is much lower than those in other states. Because the video monitoring device performs interception using the low frequency band (for example, Sub-1 GHz) in most periods of time instead of continuously transmitting a keepalive packet in the high frequency band, entire power consumption of the device is greatly optimized. Moreover, the security parameter is obtained through a direct negotiation between the cloud platform and the video monitoring device, encrypts access authentication of the device and the video stream, and does not depend on the gateway (that is, repeater) in the intermediate link, thereby ensuring gateway-unrelated security.

The multimedia data processing method provided in this embodiment of this application is specifically described below.

Figure 5:
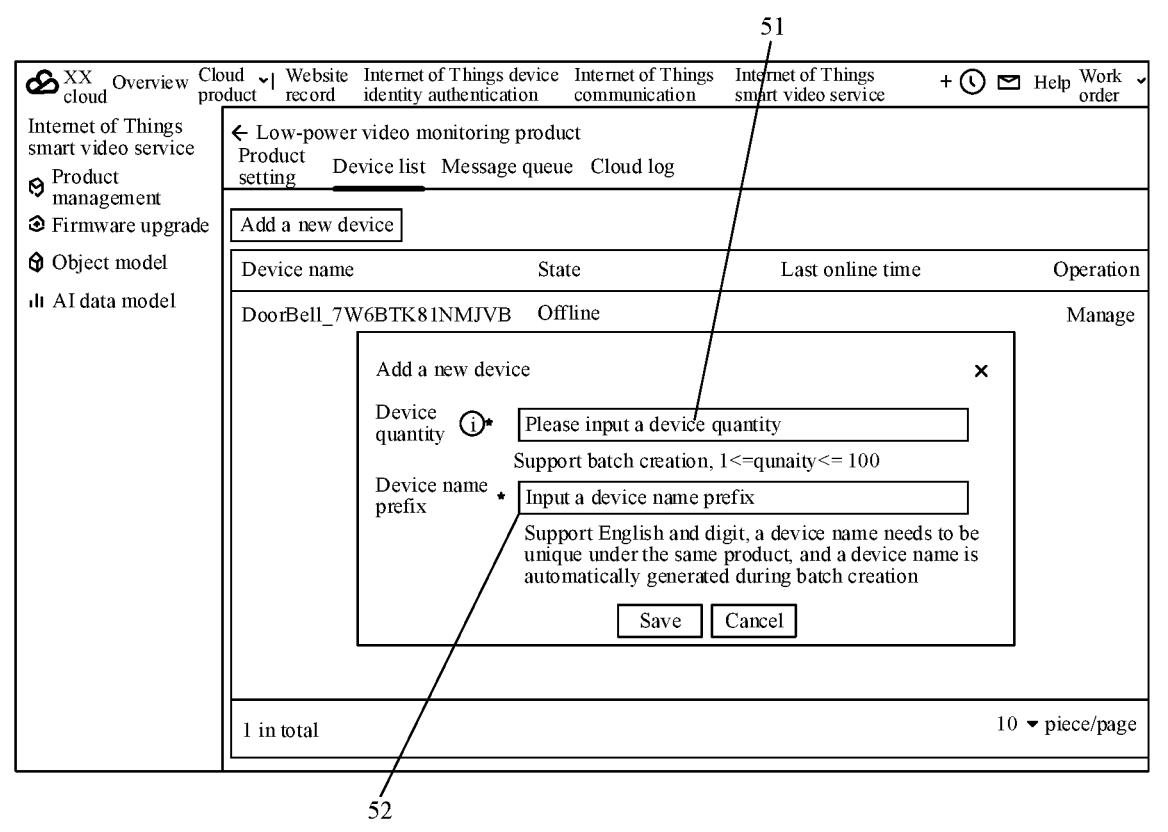

Exemplarily, FIG. 5 is a schematic diagram of an interface of creating a video monitoring device on a cloud management console according to an embodiment of this application. As shown in FIG. 5, a user first logs in to a cloud platform (that is, a computer program corresponding to the cloud platform, that is, a cloud intelligent video monitoring service, configured to provide a remotely accessible man-machine interaction interface to a manager, provide a function of managing a video monitoring device and a gateway, and provide a monitoring data based service to an APP), creates the gateway, adds the video monitoring device (including a device quantity 51 and a device name prefix 52), and obtains a gateway ID, a gateway key file, a video monitoring device ID, a video monitoring device key file, and the like.

Then, the cloud platform respectively burns a gateway parameter, a video monitoring device parameter, and matching Software Development Kit (SDK) firmware into the gateway and the video monitoring device. Subsequently, the gateway accesses a network to connect to the cloud platform, and the video monitoring device is started to access the gateway. In this way, online states of the gateway and the video monitoring device may be seen on the cloud platform.

Figure 6:
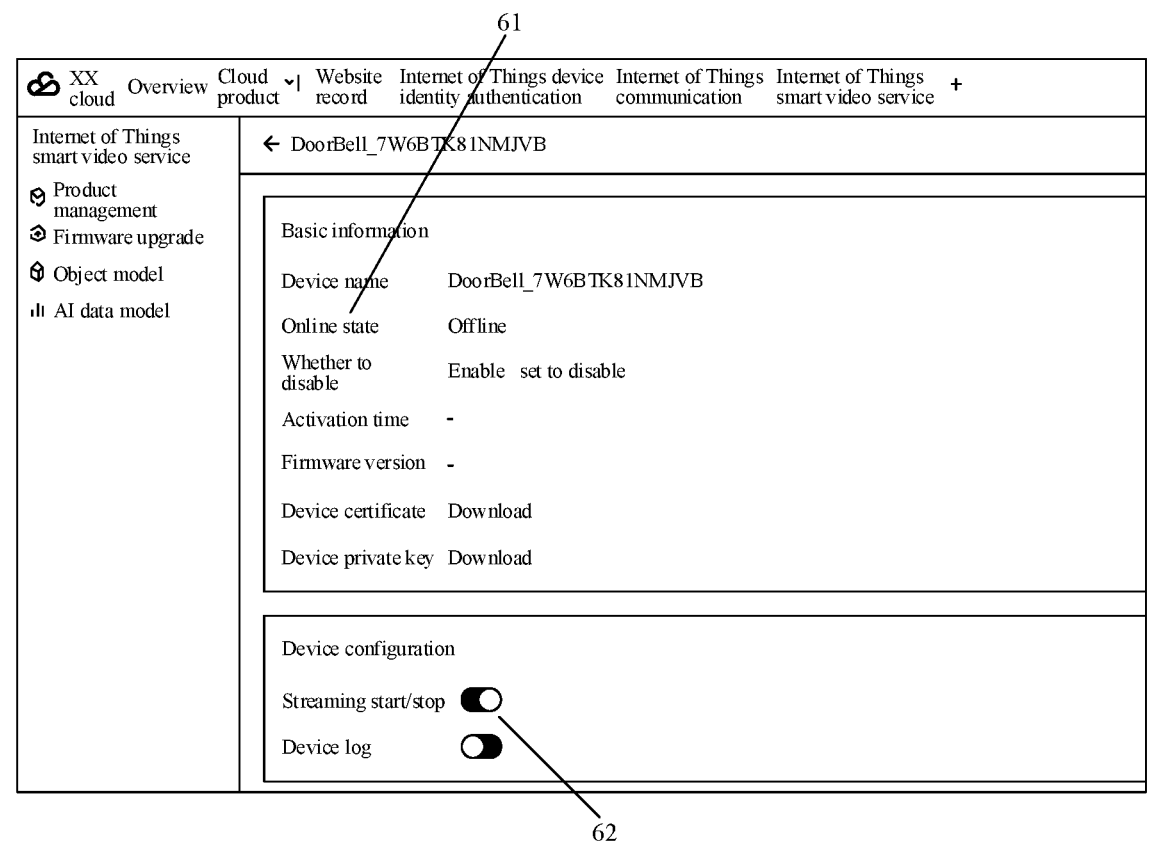

Exemplarily, FIG. 6 is a schematic diagram of an interface of viewing a state of a video monitoring device on a cloud management console according to an embodiment of this application. As shown in FIG. 6, it may be seen on a cloud platform that a video monitoring device is currently in an offline state 61. Moreover, a streaming start/stop button 62 is further displayed on the cloud platform. When a user clicks streaming start, the cloud platform transmits a streaming request to a gateway, so as to obtain video data and audio data that are acquired by the video monitoring device.

Figure 7:
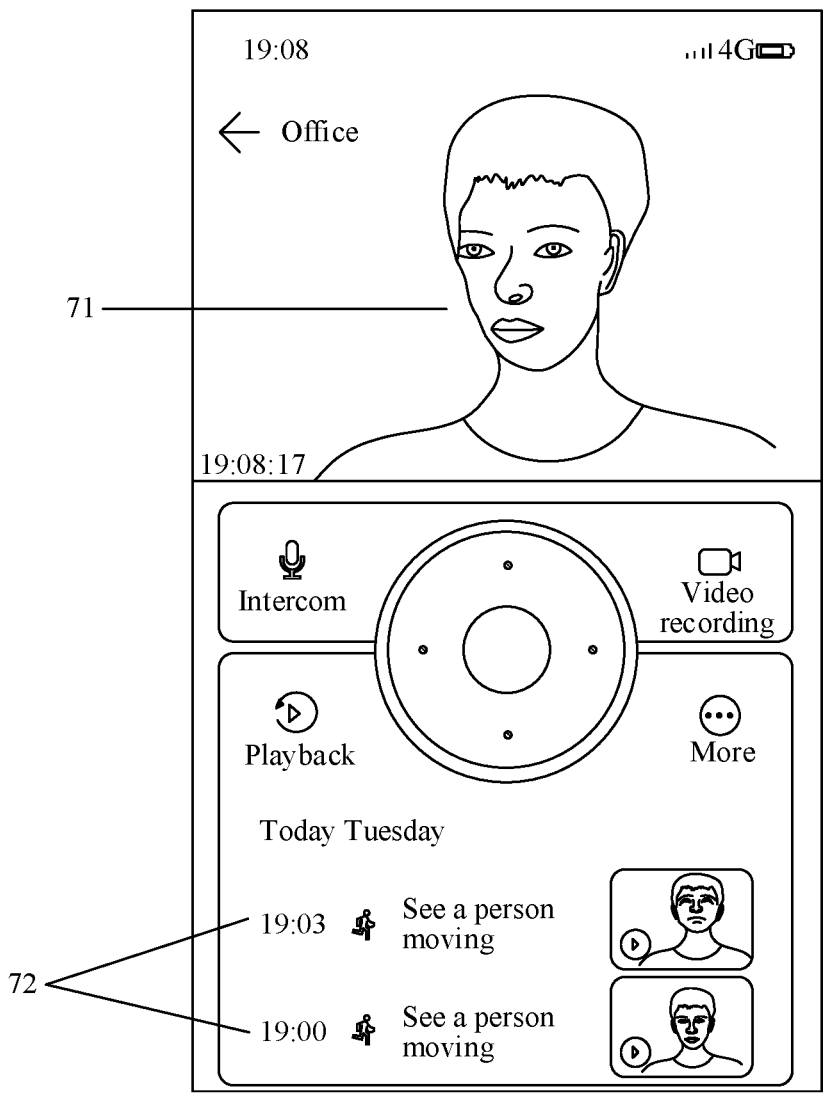
FIG. 7 is a schematic diagram of an interface of watching, in an intelligent terminal, multimedia data transmitted by a video monitoring device according to an embodiment of this application.

Exemplarily, FIG. 7 is a schematic diagram of an interface of watching, in an intelligent terminal, an audio or a video transmitted by a video monitoring device according to an embodiment of this application. As shown in FIG. 7, video data 71 acquired by a video monitoring device in real time may be watched in an intelligent terminal. Moreover, historical video data 72 acquired by the video monitoring device is further displayed in a user interface of the intelligent terminal.

The multimedia data processing method provided in the embodiments of this application involves such four parts as the video monitoring device, the gateway, the cloud platform, and the intelligent terminal. Functional modules included in the video monitoring device and the gateway are shown in FIG. 8.

Figure 8:
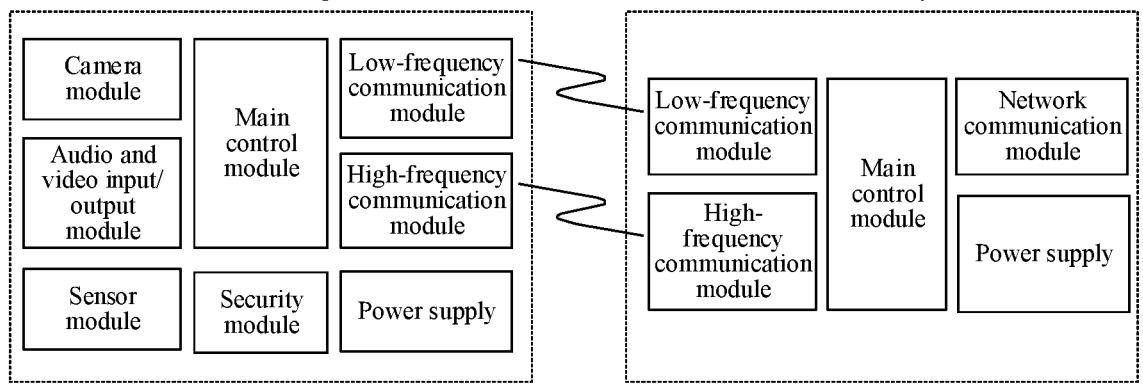
FIG. 8 is a schematic diagram of functional modules included in a video monitoring device and a gateway according to an embodiment of this application.

Referring to FIG. 8, the video monitoring device includes parts such as a main control module, a low-frequency communication module, a high-frequency communication module, a security module, a camera module, an audio and video input/output module, a sensor module, and a power module. The main control module is configured to be responsible for overall scheduling and running of the device. The low-frequency communication module runs in a low frequency band, typically Sub-1 GHz (for example, 433 MHz or 470 MHz), and is configured to transmit communication parameters with small data volumes, for example, a frequency required for high-frequency communication, a gateway address, an authentication code (that is, a collective name of a challenge code and a security authentication code), and control signaling (for example, a wakeup instruction and a monitoring stop instruction that are transmitted by a server). The high-frequency communication module runs in a high frequency band, is typically a 2.4 GHz communication module or 5.8 GHz communication module, and is configured to transmit audio and video data with a relatively large data volume. The security module may be built in the main control module or may be an individual security chip, and is configured to securely store a key used for communication and other sensitive data and execute a password algorithm (for example, convert, through calculation, the challenge code into the security authentication code according to the key). The camera module is mainly configured to be responsible for acquiring video stream data or picture stream data, and includes a lens, an image coding and decoding module, a video coding and decoding module, and the like. The audio and video input/output module is mainly configured to be responsible for acquiring or outputting audio stream data, and includes a microphone, a loudspeaker, a power amplifier, and the like. The sensor module is configured to acquire an external analog signal, convert the external analog signal into a digital signal, and output the digital signal to the main control module for use, and the main control module determines whether to start audio and video recording, where main representation forms of the sensor module may include a button, an infrared sensor, a smog sensor, and the like. The power module is configured to supply power to the device, and is in such a typical form as a lithium battery or a dry battery.

The gateway mainly includes parts such as a main control module, a low-frequency communication module, a high-frequency communication module, a network communication module, and a power module. The main control module is configured to be responsible for overall scheduling and running of the device. The low-frequency communication module runs in a low frequency band, typically Sub-1 GHz (for example, 433 MHz or 470 MHz), and is configured to transmit communication parameters with small data volumes, for example, a frequency required for high-frequency communication, a gateway address, an authentication code, and control signaling. The high-frequency communication module runs in a high frequency band, is typically a 2.4 GHz communication module or 5.8 GHz communication module, and is configured to transmit audio and video data with a relatively large data volume. The network communication module is configured to be responsible for performing network communication with the cloud platform or the intelligent terminal, and receiving a control instruction of the cloud platform or transmitting, to the cloud platform or the intelligent terminal, signaling and audio and video data that are acquired from the low-power video monitoring device. Typical network communication modules are a wired Ethernet module, a Wi-Fi module, a 4G (4 Generation) module, a 5G (5 Generation) module, and the like. The power module is configured to supply power to the gateway, and is typically a power supply module for converting mains into a direct current.

Figure 9:
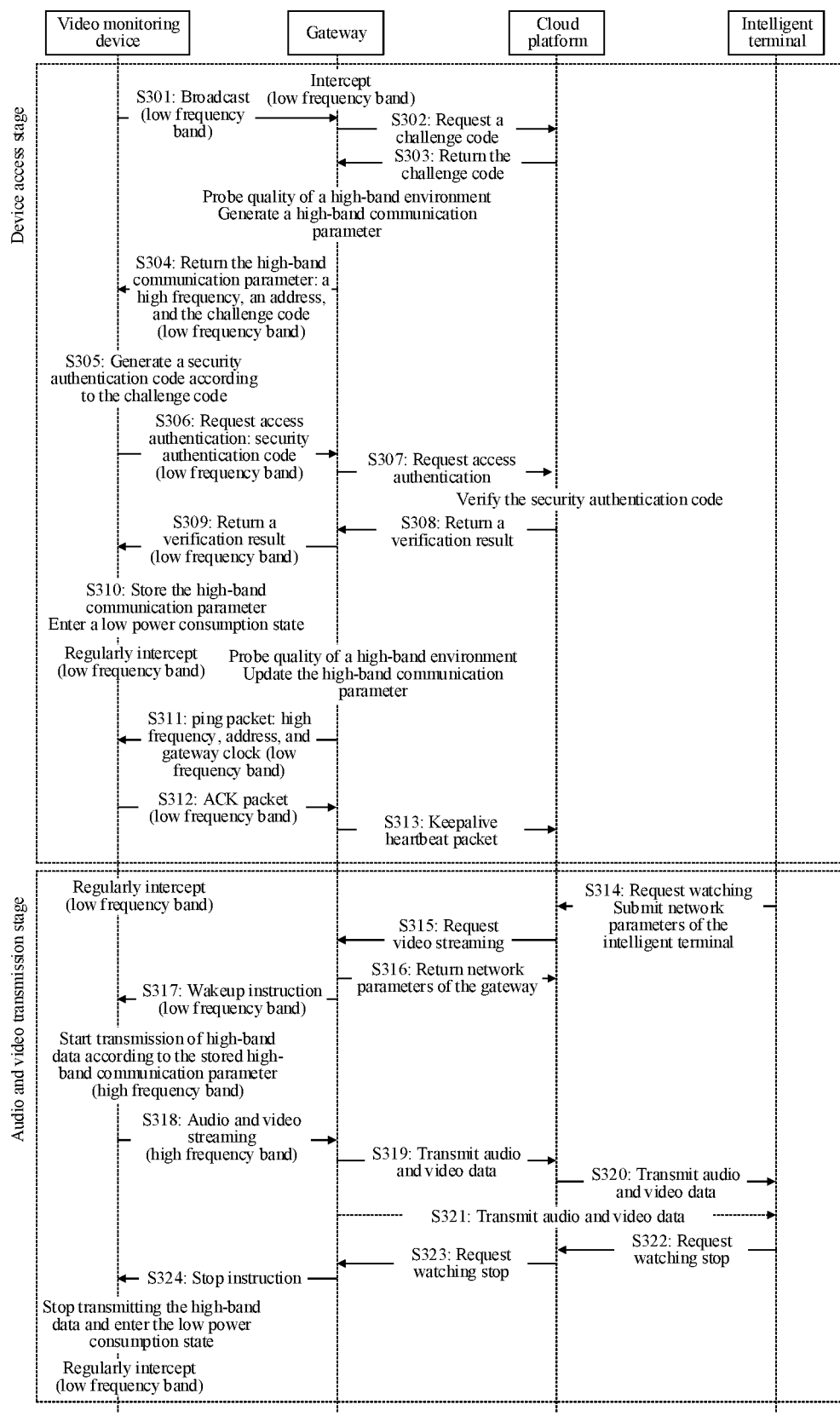
FIG. 9 is a schematic flowchart of a multimedia data processing method according to an embodiment of this application.

Exemplarily, FIG. 9 is a schematic flowchart of a multimedia data processing method according to an embodiment of this application. The method includes: A video monitoring device is powered on to run, enters a low power consumption state, and is actively woken up by cloud, a video is streamed to an intelligent terminal and watched, and the like.

A process that the video monitoring device accesses a cloud platform is described first below.

Step S301. A video monitoring device broadcasts an access request in a low frequency band.

Step S302. A gateway requests, from a cloud platform after intercepting, in the low frequency band, the access request broadcast by the video monitoring device, a challenge code used for authenticating identity information of the video monitoring device.

Step S303. The cloud platform generates the challenge code and returns the challenge code to the gateway.

Step S304. The gateway probes quality of a current high-band wireless environment, selects a high-band communication frequency with relatively good communication quality and a gateway address, and transmits the selected frequency and gateway address and the challenge code to the video monitoring device in the low frequency band.

Step S305. The video monitoring device receives, in the low frequency band, a high-band communication parameter and the challenge code that are transmitted by the gateway, and converts, through calculation, the challenge code into a security authentication code according to a key preset in the video monitoring device or obtained from the cloud platform.

Step S306. The video monitoring device transmits the security authentication code to the gateway in the low frequency band.

Step S307. The gateway transmits the security authentication code transmitted by the video monitoring device to the cloud platform for verification.

Step S308. The cloud platform performs verification on the security authentication code, and returns a verification result to the gateway.

Step S309. The gateway transmits the verification result to the video monitoring device in the low frequency band.

Step S310. The video monitoring device stores the high-frequency communication parameter, and enters a low power consumption state; and subsequently regularly intercepts, on a designated low frequency, a ping packet transmitted by the gateway.

Step S311. The gateway periodically probes the quality of the high-band wireless environment, updates the high-band communication parameter as required, and transmits the ping packet to the video monitoring device in the low frequency band.

Step S312. The video monitoring device receives, in the low frequency band, the ping packet transmitted by the gateway, updates the high-band communication parameter and a local clock according to content of the ping packet, and transmits an ACK packet to the gateway.

Step S313. After receiving the ACK packet transmitted by the video monitoring device, the gateway transmits a keepalive heartbeat packet to the cloud platform, so as to inform the cloud platform of an online situation of the video monitoring device.

An audio and video data transmission process is described below.

Step S314. A user operates an APP installed on an intelligent terminal, to initiate a video watching request to the cloud platform. Moreover, the cloud platform obtains network parameters of the intelligent terminal, including a public Internet Protocol (IP) address, a port, and the like of the intelligent terminal.

Step S315. The cloud platform initiates a request for video streaming to the gateway, and obtains network parameters of the gateway.

Step S316. The gateway returns the corresponding network parameters to the cloud platform, including a public IP address, a port, and the like of the gateway. Moreover, the cloud platform attempts to directly establish a connection between the gateway and the intelligent terminal. When a direct-connection channel between the gateway and the intelligent terminal is not established successfully, step S319 and step S320 are performed after step S318 is performed. When a direct-connection channel between the gateway and the intelligent terminal is established successfully, step S321 is directly performed after step S318 is performed.

Step S317. The gateway initiates a wakeup instruction to the video monitoring device in the low frequency band, and prepares to receive, on a high frequency and an address that are most recently selected, multimedia data acquired by the video monitoring device.

Step S318. The video monitoring device exits from the low power consumption state, starts a camera module and an audio and video input/output module to acquire audio and video data, and directly transmits the acquired audio and video data to the gateway on the designated high frequency and address according to the locally stored high-band communication parameter.

Step S319. The gateway transmits the audio and video data transmitted by the video monitoring device to the cloud platform.

Step S320. The cloud platform forwards the audio and video data to the intelligent terminal.

Step S321. The gateway directly transmits the audio and video data transmitted by the video monitoring device to the intelligent terminal.

Step S322. The user operates the intelligent terminal to transmit a watching stop request to the cloud platform.

Step S323. The cloud platform forwards the watching stop request to the gateway.

Step S324. The gateway instructs, in any frequency band, the video monitoring device to stop transmitting the audio and video data, and the video monitoring device again enters the low power consumption state of regularly intercepting, in the low frequency band, the ping packet transmitted by the gateway.

For selection of communication frequency bands, in some embodiments, a low-frequency part may be a frequency band about 1 GHz, and a high-frequency part may be a frequency band such as 5.8 GHz. Targeted selection may be made according to power consumption and transmission rates of different frequency bands. This is not limited in the embodiments of this application.

In some other embodiments, the audio and video data acquired by the video monitoring device may alternatively be transmitted to a router or a switch instead of being forwarded through the aforementioned gateway. For example, the low frequency band is used for only system wakeup of the video monitoring device up, and the woken video monitoring device may directly negotiate a communication parameter with the router or the switch in the high frequency band (for example, a frequency band in which the router or the switch performs interception by default), and then transmit the acquired audio and video data to the router or the switch based on the negotiated communication parameter.

In some other embodiments, the foregoing recorded manner of burning an identity (ID) of the device and a key of the device that are generated by the cloud platform into the device may alternatively be as follows: An ID and a key are automatically generated on the side of the device or depend on internal components of the device, for example, a main control chip and a security chip, and transferred to the side of the cloud platform in a specific manner. For example, the ID of the main control chip and the key of the security chip are transmitted to the gateway and forwarded by the gateway to the cloud platform.

In the multimedia data processing method provided in this embodiment of this application, based on the dual-band communication and cloud platform control manner, respective advantages of different communication frequency bands in power consumption and transmission rate are maximally used, which may greatly increase service time of the video monitoring device, thereby improving maintainability and user experience of the product. Moreover, the cloud platform and the video monitoring device directly negotiate the security parameter. For the low-power video monitoring system with such an intermediate link as the gateway, when the audio and video data flows through such an intermediate device as the gateway, there is no risk of decrypting the data, thereby protecting privacy security of the user data.

An embodiment of this application provides a computer program product or a computer program. The computer program product or the computer program includes computer instructions, and the computer instructions are stored in a non-transitory computer-readable storage medium. A processor of a computer device reads the computer instructions from the computer-readable storage medium, and executes the computer instructions, to cause the computer device to perform the foregoing multimedia data processing method of the embodiments of this application.

An embodiment of this application provides a non-transitory computer-readable storage medium storing executable instructions. When the executable instructions are executed by a processor, the processor is caused to perform the method provided in the embodiments of this application, for example, the multimedia data processing method shown in FIG. 4A or FIG. 4B.

In some embodiments, the storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in the plurality of collaborative files (for example, be stored in files of one or modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

In conclusion, the embodiments of this application have the following beneficial effects:

(1) A video monitoring solution based on dual-band communication and cloud platform control is proposed, respective advantages of different communication frequency bands in power consumption and transmission rate are maximally used, which may greatly increase service time of the video monitoring device, thereby improving maintainability and user experience of the product.

(2) The cloud platform and the video monitoring device directly negotiate the security parameter. For the low-power video monitoring system with such an intermediate link as the gateway, when the audio and video data flows through such an intermediate device as the gateway, there is no risk of decrypting the data, thereby protecting privacy security of the user data.

The foregoing descriptions are merely embodiments of this application and are not intended to limit the protection scope of this application. Any modification, equivalent replacement, or improvement made without departing from the spirit and range of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A multimedia data processing method, performed by an electronic device, the method comprising:
    receiving, in a first wireless communication frequency band, a communication parameter and a security parameter that are transmitted by a wireless network transmission device, wherein the communication parameter identifies a second wireless communication frequency band, and the security parameter identifies an encryption key;
    receiving, in the first wireless communication frequency band, a wakeup instruction transmitted by a server through the wireless network transmission device;
    performing data acquisition on an environment of the electronic device using a camera in the electronic device according to the wakeup instruction to obtain multimedia data;
    encrypting the multimedia data according to the encryption key, to obtain encrypted multimedia data; and
    transmitting the encrypted multimedia data to the wireless network transmission device in the second wireless communication frequency band, and then transmitting the encrypted multimedia data to a terminal through the wireless network transmission device, wherein communication frequencies of the first wireless communication frequency band are less than communication frequencies of the second wireless communication frequency band.

2. The method according to claim 1, wherein the encryption key is a locally stored encryption key of the electronic device or an encryption key obtained from the server.

3. The method according to claim 1, wherein before the receiving a wakeup instruction transmitted by a server through a wireless network transmission device, the method further comprises:
    requesting, in the first wireless communication frequency band, the server through the wireless network transmission device to perform access authentication on the electronic device; and
    entering a first power consumption state when an access authentication success result transmitted by the server is received in the first wireless communication frequency band, wherein the electronic device is configured to disable an acquisition function in the first power consumption state.

4. The method according to claim 3, wherein the requesting, in the first wireless communication frequency band, the server through the wireless network transmission device to perform access authentication on the electronic device electronic device comprises:
    transmitting, in the first wireless communication frequency band, an access request to the wireless network transmission device, wherein the access request is used for triggering the wireless network transmission device to request, from the server, a challenge code used for authenticating the electronic device;
    receiving, in the first wireless communication frequency band, the challenge code transmitted by the server through the wireless network transmission device;
    encrypting the challenge code according to a locally stored encryption key of the electronic device or an encryption key obtained from the server, to obtain a security authentication code; and
    transmitting, in the first wireless communication frequency band, the security authentication code to the wireless network transmission device, wherein the security authentication code is used for requesting the server to perform access authentication on the electronic device through the security authentication code.

5. The method according to claim 3, wherein after the entering a first power consumption state, the method further comprises:
    receiving, in the first wireless communication frequency band, a ping request transmitted by the wireless network transmission device; and
    transmitting, in the first wireless communication frequency band, an acknowledge message of the ping request to the wireless network transmission device, wherein the acknowledge message is used for triggering the wireless network transmission device to transmit a keepalive heartbeat message to the server, wherein the keepalive heartbeat message is used for indicating to the server that the electronic device is in an online state.

6. The method according to claim 1, wherein the performing data acquisition on an environment of the electronic device according to the wakeup instruction to obtain multimedia data comprises:
  switching from a first power consumption state to a second power consumption state according to the wakeup instruction, wherein the electronic device is configured to disable an acquisition function in the first power consumption state and enable the acquisition function in the second power consumption state; and
  performing data acquisition on the environment in the second power consumption state to obtain multimedia data, wherein a type of the multimedia data comprises at least one of the following: a video and an audio.

7. The method according to claim 1, wherein the transmitting the multimedia data to a terminal through the wireless network transmission device comprises:
  when the wireless network transmission device has established a communicative connection with the terminal, transmitting the multimedia data to the terminal through the communicative connection; and
  when the wireless network transmission device has not established a communicative connection with the terminal, transmitting the multimedia data to the terminal through the wireless network transmission device and the server.

8. The method according to claim 1, further comprising:
  switching from a second power consumption state to a first power consumption state when a stop instruction transmitted by the server through the wireless network transmission device is received, wherein the electronic device disables an acquisition function in the first power consumption state; and
  regularly intercepting, in the first wireless communication frequency band, the wakeup instruction transmitted by the wireless network transmission device, wherein the electronic device enables the acquisition function in the second power consumption state.

9. The method according to claim 1, wherein before the transmitting the multimedia data to the wireless network transmission device in a second wireless communication frequency band, the method further comprises:
  broadcasting a parameter request in a default wireless communication frequency band of the wireless network transmission device, wherein the default wireless communication frequency band is a frequency band in which the wireless network transmission device performs interception by default; and
  receiving a communication parameter in the default wireless communication frequency band, wherein the communication parameter is broadcast by the wireless network transmission device in the default wireless communication frequency band in response to the parameter request.

10. The method according to claim 9, wherein
  the communication parameter comprises at least one of the following: the second wireless communication frequency band, wherein the default wireless communication frequency band is a frequency sub-band of the second wireless communication frequency band; and an address of the wireless network transmission device; and
  the transmitting the multimedia data to the wireless network transmission device in a second wireless communication frequency band comprises:
  transmitting the multimedia data in the default wireless communication frequency band, wherein a destination address of the multimedia data is the address of the wireless network transmission device.

11. An electronic device, comprising:
  a memory, configured to store executable instructions; and
  a processor, configured to implement, when processing the executable instructions, a multimedia data processing method including:
  receiving, in a first wireless communication frequency band, a communication parameter and a security parameter that are transmitted by a wireless network transmission device, wherein the communication parameter identifies a second wireless communication frequency band, and the security parameter identifies an encryption key;
  receiving, in the first wireless communication frequency band, a wakeup instruction transmitted by a server through the wireless network transmission device;
  performing data acquisition on an environment of the electronic device using a camera in the electronic device according to the wakeup instruction to obtain multimedia data;
  encrypting the multimedia data according to the encryption key, to obtain encrypted multimedia data; and
  transmitting the encrypted multimedia data to the wireless network transmission device in the second wireless communication frequency band, and then transmitting the encrypted multimedia data to a terminal through the wireless network transmission device, wherein communication frequencies of the first wireless communication frequency band are less than communication frequencies of the second wireless communication frequency band.

12. The electronic device according to claim 11, wherein the encryption key is a locally stored encryption key of the electronic device or an encryption key obtained from the server.

13. The electronic device according to claim 11, wherein before the receiving a wakeup instruction transmitted by a server through a wireless network transmission device, the method further comprises:
  requesting, in the first wireless communication frequency band, the server through the wireless network transmission device to perform access authentication on the electronic device; and
  entering a first power consumption state when an access authentication success result transmitted by the server is received in the first wireless communication frequency band, wherein the electronic device is configured to disable an acquisition function in the first power consumption state.

14. The electronic device according to claim 13, wherein the requesting, in the first wireless communication frequency band, the server through the wireless network transmission device to perform access authentication on the electronic device comprises:
  transmitting, in the first wireless communication frequency band, an access request to the wireless network transmission device, wherein the access request is used for triggering the wireless network transmission device to request, from the server, a challenge code used for authenticating the electronic device;
  receiving, in the first wireless communication frequency band, the challenge code transmitted by the server through the wireless network transmission device;
  encrypting the challenge code according to a locally stored encryption key of the electronic device or an encryption key obtained from the server, to obtain a security authentication code; and transmitting, in the first wireless communication frequency band, the security authentication code to the wireless network transmission device, wherein the security authentication code is used for requesting the server to perform access authentication on the electronic device through the security authentication code.

15. The electronic device according to claim 13, wherein after the entering a first power consumption state, the method further comprises:

receiving, in the first wireless communication frequency band, a ping request transmitted by the wireless network transmission device; and transmitting, in the first wireless communication frequency band, an acknowledge message of the ping request to the wireless network transmission device, wherein the acknowledge message is used for triggering the wireless network transmission device to transmit a keepalive heartbeat message to the server, wherein the keepalive heartbeat message is used for indicating to the server that the electronic device is in an online state.

16. The electronic device according to claim 11, wherein the performing data acquisition on an environment of the electronic device according to the wakeup instruction to obtain multimedia data comprises:

switching from a first power consumption state to a second power consumption state according to the wakeup instruction, wherein the electronic device is configured to disable an acquisition function in the first power consumption state, and enable the acquisition function in the second power consumption state; and performing data acquisition on the environment in the second power consumption state to obtain multimedia data, wherein a type of the multimedia data comprises at least one of the following: a video and an audio.

17. The electronic device according to claim 11, wherein the transmitting the multimedia data to a terminal through the wireless network transmission device comprises:

when the wireless network transmission device has established a communicative connection with the terminal, transmitting the multimedia data to the terminal through the communicative connection; and when the wireless network transmission device has not established a communicative connection with the terminal, transmitting the multimedia data to the terminal through the wireless network transmission device and the server.

18. The electronic device according to claim 11, wherein the method further comprises:

switching from a second power consumption state to a first power consumption state when a stop instruction transmitted by the server through the wireless network transmission device is received, wherein the electronic device disables an acquisition function in the first power consumption state; and regularly intercepting, in the first wireless communication frequency band, the wakeup instruction transmitted by the wireless network transmission device, wherein the electronic device enables the acquisition function in the second power consumption state.

19. The electronic device according to claim 11, wherein before the transmitting the multimedia data to the wireless network transmission device in a second wireless communication frequency band, the method further comprises:

broadcasting a parameter request in a default wireless communication frequency band of the wireless network transmission device, wherein the default wireless communication frequency band is a frequency band in which the wireless network transmission device performs interception by default; and receiving a communication parameter in the default wireless communication frequency band, wherein the communication parameter is broadcast by the wireless network transmission device in the default wireless communication frequency band in response to the parameter request.

20. A non-transitory computer-readable storage medium, storing executable instructions, the executable instructions, when executed by a processor of an electronic device, implementing a multimedia data processing method including:

receiving, in a first wireless communication frequency band, a communication parameter and a security parameter that are transmitted by a wireless network transmission device, wherein the communication parameter identifies a second wireless communication frequency band, and the security parameter identifies an encryption key:

receiving, in the first wireless communication frequency band, a wakeup instruction transmitted by a server through the wireless network transmission device;

performing data acquisition on an environment of the electronic device using a camera in the electronic device according to the wakeup instruction to obtain multimedia data;

encrypting the multimedia data according to the encryption key, to obtain encrypted multimedia data; and transmitting the encrypted multimedia data to the wireless network transmission device in the second wireless communication frequency band, and then transmitting the encrypted multimedia data to a terminal through the wireless network transmission device, wherein communication frequencies of the first wireless communication frequency band are less than communication frequencies of the second wireless communication frequency band.

* * * * *